US008179227B2

(12) United States Patent
Dziadosz

(10) Patent No.: US 8,179,227 B2
(45) Date of Patent: May 15, 2012

(54) EMPLOYING EXTERNAL STORAGE DEVICES AS MEDIA FOR ACCESS CONTROL PANEL CONTROL INFORMATION

(75) Inventor: John A Dziadosz, Burlington, WI (US)

(73) Assignee: Honeywell International Inc., Morristown, NJ (US)

( * ) Notice: Subject to any disclaimer, the term of this patent is extended or adjusted under 35 U.S.C. 154(b) by 894 days.

(21) Appl. No.: 11/936,899

(22) Filed: Nov. 8, 2007

(65) Prior Publication Data

US 2009/0121830 A1 May 14, 2009

(51) Int. Cl.

| | |
|---|---|
| ***G05B 19/00*** | (2006.01) |
| ***H04Q 9/00*** | (2006.01) |
| ***G06F 21/00*** | (2006.01) |
| ***H04L 9/32*** | (2006.01) |

(52) U.S. Cl. ...... 340/5.6; 340/5.74; 340/5.54; 340/5.21; 340/5.1; 340/5.24; 713/185; 713/172; 713/171

(58) Field of Classification Search .................. 235/382; 380/282; 340/568.1

See application file for complete search history.

(56) References Cited

U.S. PATENT DOCUMENTS

| | | | | |
|---|---|---|---|---|
| 7,167,094 | B2 * | 1/2007 | Ciarcia et al. | 340/568.1 |
| 7,318,550 | B2 * | 1/2008 | Bonalle et al. | 235/380 |
| 2003/0028814 | A1 * | 2/2003 | Carta et al. | 713/202 |
| 2003/0145221 | A1 * | 7/2003 | Atzmueller et al. | 713/200 |
| 2005/0033688 | A1 * | 2/2005 | Peart et al. | 705/39 |
| 2006/0102717 | A1 * | 5/2006 | Wood et al. | 235/382 |
| 2007/0133807 | A1 * | 6/2007 | Lee et al. | 380/282 |

* cited by examiner

*Primary Examiner* — Daniel Wu
*Assistant Examiner* — Pameshanand Mahase
(74) *Attorney, Agent, or Firm* — Husch Blackwell

(57) ABSTRACT

The present invention advantageously provides a flexible system and method for a security system having a control panel with control information for performing security operations, and a token having its own control information, such that the panel reads control information from the token and determines if the token is authentic, and, if it is, the panel updates its control information in accordance with the token's control information and performs the security operations based on its updated control information, and the updated control information is copied from the panel to the token.

6 Claims, 2 Drawing Sheets

EMPLOYING EXTERNAL STORAGE DEVICES AS MEDIA FOR ACCESS CONTROL PANEL CONTROL INFORMATION

FIELD OF THE INVENTION

This invention relates generally to security systems having access control panels for monitoring and controlling access to restricted areas. In particular, this invention relates to a system and method for employing external storage devices as media for access control panel control information.

BACKGROUND OF THE INVENTION

Access control systems provide security to homes and businesses by controlling access to a facility and preventing unwanted intrusions. Generally, an access control system has both hardware and software that are integrated to provide security technologies. Most systems contain access control panels that operate with software to control access, identify users, and detect intruders. To obtain access to a restricted space monitored by an access control panel, an individual presents an authentication token, for example, an id card. Using data from the authentication token, the control panel processes its "control information" including features, capabilities, configured behaviors, and access control decisions in the panel. The control information determined by the controller at the time an authentication token is presented is limited to that which had been installed on the access control system. A specific update process is required to change the system's installed logic and/or data.

U.S. Patent Application Publication No. 2003/0028814 for Smart Card Access Control System discloses access readers that are pre-programmed with an initial activation key, and initialized by an activation card encoded with the same key. Different card types are used with the access reader to perform particular individual tasks such as activation, access, deactivation, and updating of the reader.

Among the problems of the aforementioned systems is the lack of flexibility in the access control panel or reader. A specific action, i.e., an update, or particular device, i.e., an activation card pre-programmed with initialization instructions, is required to change the logic and/or data on the access control panel after installation.

SUMMARY OF THE INVENTION

The present invention solves the aforementioned problems by enabling all the control information on an access control panel not only to be partially or completely discerned from information contained on a storage device, but also to be changed accordingly. Further, all the control information on an access control panel can be copied onto a storage device for backup and retrieval.

Advantageously, the present invention provides a flexible system and method for a security system having a control panel with control information for performing security operations, and a token having its own control information, such that the panel reads control information from the token and determines if the token is authentic, and, if it is, the panel updates its control information in accordance with the token's control information and performs the security operations based on its updated control information, and the updated control information is copied from the panel to the token.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

The foregoing and other objects, aspects, features, advantages of the invention will become more apparent from the following description and from the claims.

DETAILED DESCRIPTION OF THE INVENTION

An inventive solution is presented to the need for a system and method that adds flexibility to the procedures for updating the logic, decisions and configuration data in an access control panel. The present invention solves this problem by using non-volatile information storage technologies such as smart cards to store "control information", that is, the access control logic, access control decisions, and configuration data including authentication data along with any data relevant to dynamically altering the access control decisions made by the access control system. This control information on the storage device could be encoded according to a predetermined format, protocol, and/or rules.

When the storage device is presented to the access control system, data in the control information is used to authenticate its presenters. The storage device's control information is then acquired by the access control panel or controller, and combined with pre-existing control information in the control panel. The combined control information, stored in the control panel, affects the controller's behavior consistent with the protocol and rules obtained from the storage device. In addition, the control information from the access control panel can be copied to the storage device creating an easily accessible backup copy of the control information.

Figure 1:
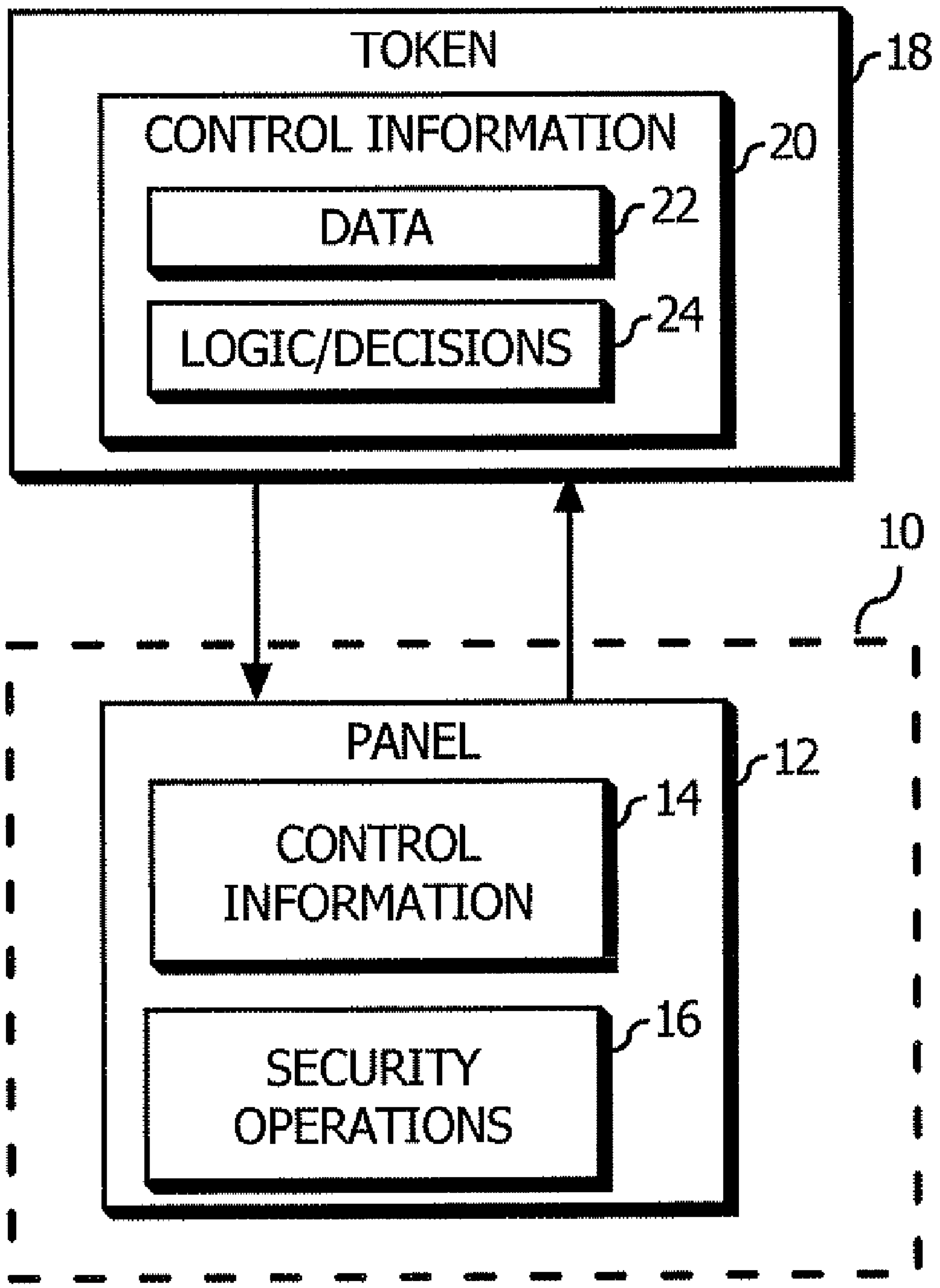
FIG. 1 is a block diagram of an exemplary embodiment of the present invention.

FIG. 1 shows a restricted area 10 to which access is controlled by a security system according to the present invention. In this embodiment, an Access Control Panel 12 is located in the restricted area 10. The Panel 12 has control information 14, which can include logic, decisions, and data. In accordance with this control information 14, one or more security operations 16 are performed. In one embodiment, the logic is programming logic that combines with the data to produce the decisions or instructions based upon which the security operations 16 are executed. Additional information, such as time of day, date, etc., can also be used to produce the decisions.

To access the restricted area 10, a user presents a storage device, such as an authorization token 18, containing control information 20 including authentication and other data 22 and logic and decisions 24, to the Panel 12. The authorization token 18 could be a Smart Card, Flash Card, Cellular Phone, PDA or any other portable device having non-volatile information storage capability and being compatible with the access control system.

The Panel 12 inputs the control information 20 from the token 18 and performs security operations 16 to authenticate the user based on the authentication data 22 as follows. The Panel 12 compares the authorization data 22 from the token's control information 20 to the control panel's control information 14 and authenticates the user or determines if the user or presenter is allowed to enter the restricted area 10 or is an authorized user of the security system, based on the data 22, and perhaps other information such as the time of day. If the user is authorized, the Panel 12 can perform a security operation 16, such as opening a door or gate to admit the user into a restricted area 10.

In addition, the logic 24 in the token's control information 20 is processed with the control information 14 in the Panel 12. The logic 24 could match the existing logic in the control panel's control information 14, or could include additional or amended programming logic, such as instructions to enable the Panel 12 to modify the control panel's control information 14 so that the decisions produced by the Panel 12 are changed. For example, logic 24 could be provided to produce a decision to allow an authorized user to be admitted at a different time than originally established. The logic 24 could also include instructions to enable the Panel 12 to open an additional door, or allow an authorized user or group of users access to a different restricted space from the originally permitted restricted area 10. If the token's control information 20 causes a change in the control panel's control information 14, then the changed control panel control information 14 is written to the token, updating its control information 20.

Figure 2:
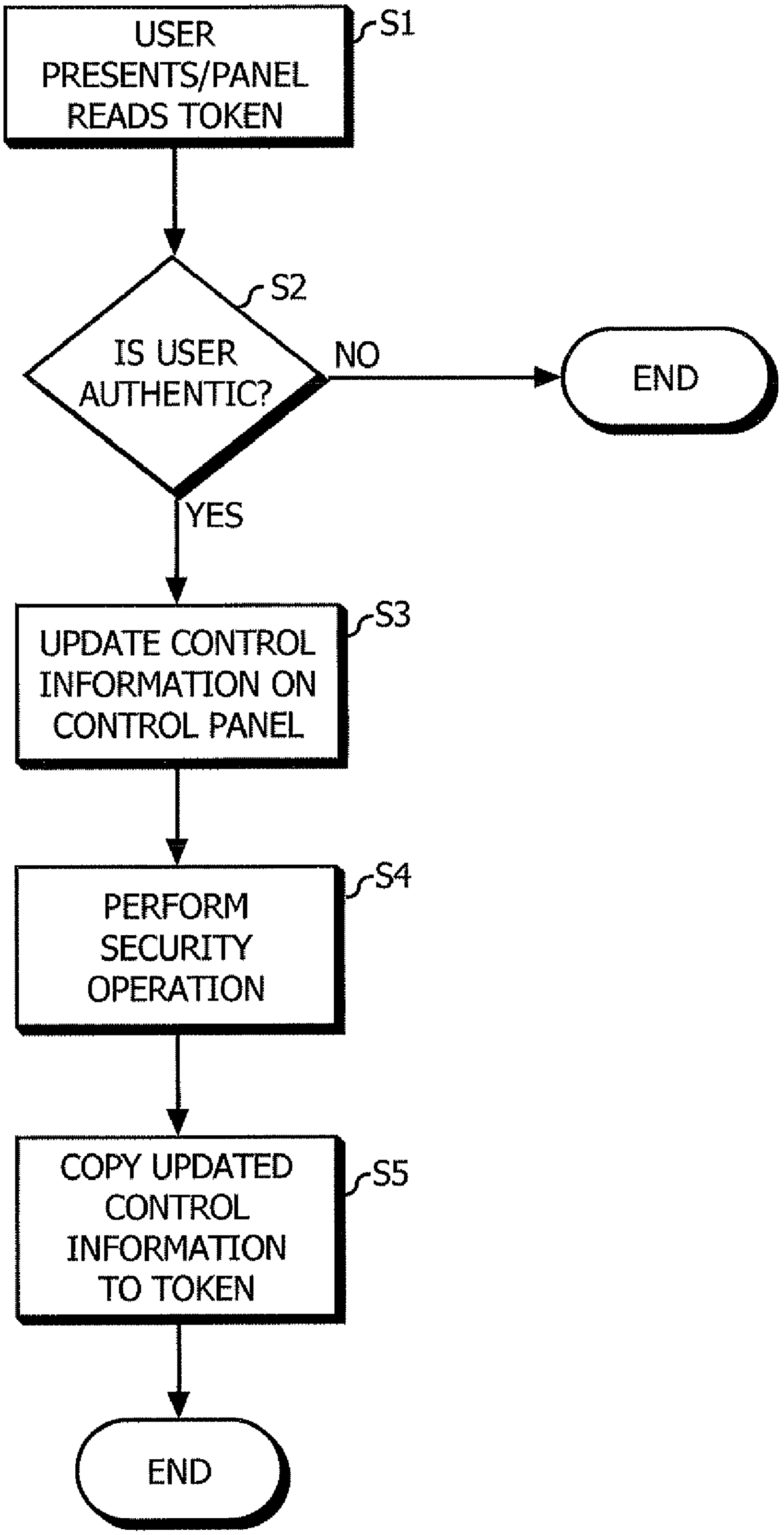
FIG. 2 is a flow diagram illustrating the steps for an exemplary embodiment of the present invention.

FIG. 2 illustrates the steps in the exemplary embodiment of the inventive system shown in FIG. 1. In Step S1, a user presents a token 18 to the Panel 12 that obtains the control information 20 including authorization data 22 from the token 18. The Panel 12 authenticates the user based on the Panel's control information 14 and the data 22 in step S2. If the user is not authorized (S2=NO), the process is terminated.

If the user is authentic or authorized (S2=YES), in step S3 the Panel 12 processes the logic and decisions 24 from the control information 20 of token 18 and updates the panel's control information 14, if appropriate. Next, in step S4, the Panel 12 performs the authorized security operation 16, such as opening a door to a restricted area 10 for the user. Next, in Step S5, the Panel 12 copies its control information 14 to the token 18, completing the process of this embodiment of the inventive system.

The inventive system enables the use of many types of external media such as non-volatile memory devices as smart card proxies containing authorization data, configuration data, decisions and/or programming logic. The ability to completely reprogram, i.e., install or re-install, an access control panel with new logic from the smart card is provided by this system. In addition, the ability to backup configuration and program logic information from an access control panel to an external media such as a smart card or smart card proxy is achieved. Hence, the access control system could be restored using the backup media. For example, in case of an equipment failure in the access control panel, the failed panel can be replaced and its control information quickly reinstalled from the backup smart card proxy.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A security system comprising:

a panel having first control information for performing security operations in a security system that allows access to a restricted space by a group of users; and a token assigned to a user of the group of users having second control information, said second control information including authorization data and logic decisions, programming logic of the control information that dynamically alters the access control decisions of the panel based upon a combination of the first and second control information, wherein said panel reads said second control information and, based on at least said authorization data of said second control information, determines if said token is authentic, and, if said token is authentic, said panel updates said first control information in accordance with at least said logic decisions of said dynamically altered access control decisions based upon said second control information, performs said security operations based on said updated first control information, and writes said updated first control information to said token, said logic decisions of the token assigned to the user and the updated first control information enabling at least some of the group of users to access a restricted space different from an originally permitted restricted space.

2. The system according to claim 1, wherein said second control infoimation is encoded bawd on one of a predetermined format, a protocol, and rules.

3. The system according to claim 1, wherein said security operations include providing access to a restricted area, unlocking a lock, and opening a door.

4. A method for operating a security system allowing access to restricted spaces by a plurality of users, the method comprising the steps of:

reading second control information from a token assigned to a user of the group of users to a panel, having first control information, said second control information including authorization data and logic decisions embodied as programming logic;

determining, using said panel and based on at least said authorization data of said second control information, if said token is authentic; and if said token is authentic:

dynamically altering the access control decisions made by the control panel by combining the first and second control information and updating said first control information on said panel by executing instructions of the programming logic in accordance with at least said logic decisions of said second control information;

performing security operations based on said updated first control information; and writing said updated first control information to said token, said updating of the first control information enabling at least some of the group of users to access a restricted space different from an originally permitted restricted space.

5. The method according to claim 4, wherein said second control information is encoded based on one of a predetermined format, a protocol, and rules.

6. The method according to claim 4, wherein said security operations include providing access to a restricted area, unlocking a lock, and opening a door.

* * * * *